(12) United States Patent
Kawabata

(10) Patent No.: US 7,689,479 B2
(45) Date of Patent: Mar. 30, 2010

(54) PRODUCT INFORMATION PROTECTING METHOD AND SYSTEM

(75) Inventor: Eiichi Kawabata, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 11/289,731

(22) Filed: Nov. 29, 2005

(65) Prior Publication Data

US 2006/0122901 A1    Jun. 8, 2006

(30) Foreign Application Priority Data

Dec. 6, 2004   (JP)   .............................. 2004-353305

(51) Int. Cl.
*G06Q 10/00*   (2006.01)
*G06F 17/50*   (2006.01)
*A01K 5/02*    (2006.01)

(52) U.S. Cl. .......................................... 705/28; 705/29
(58) Field of Classification Search ................. 235/375, 235/383, 385; 340/5.92, 572.4, 573.1, 825.49, 340/988, 995.27, 10.4, 572.1, 573.3, 870.07; 380/259; 705/3, 22, 26, 27, 28, 35, 1
See application file for complete search history.

(56) References Cited

U.S. PATENT DOCUMENTS

| | | | |
|---|---|---|---|
| 7,180,422 B2 * | 2/2007 | Milenkovic et al. | 340/572.4 |
| 7,243,855 B2 * | 7/2007 | Matsumoto et al. | 235/492 |
| 7,339,476 B2 * | 3/2008 | Macurek et al. | 340/572.1 |
| 7,365,636 B2 * | 4/2008 | Doi et al. | 340/10.4 |
| 2002/0116274 A1 | 8/2002 | Hind et al. | |
| 2003/0015586 A1 * | 1/2003 | Okamura | 235/385 |
| 2004/0069852 A1 * | 4/2004 | Seppinen et al. | 235/451 |
| 2004/0254829 A1 * | 12/2004 | Tripp | 705/10 |
| 2005/0036620 A1 * | 2/2005 | Casden et al. | 380/259 |
| 2005/0258937 A1 * | 11/2005 | Neuwirth | 340/5.92 |

FOREIGN PATENT DOCUMENTS

| | | |
|---|---|---|
| JP | 2000-30150 | 1/2000 |
| JP | 2002-31900 | 10/2002 |
| JP | 2002319001 A2 | 10/2002 |
| JP | 2004-208097 | 7/2004 |
| JP | 2004-292095 | 10/2004 |
| JP | 2004-318645 | 11/2004 |
| JP | 2005-165410 | 6/2005 |
| JP | 2006-079217 | 6/2006 |

OTHER PUBLICATIONS

Thomas Claburn, and George V Hulme. "RFID'S: Security Challenge." Information Week Nov. 15, 2004: ABI/Inform Global, ProQuest. Web. Nov. 3, 2009.*

* cited by examiner

*Primary Examiner*—Matthew S Gart
*Assistant Examiner*—Mohammad R Ullah Masud
(74) *Attorney, Agent, or Firm*—Schmeiser, Olsen & Watts

(57) ABSTRACT

A method and system for protecting product information stored in a wireless tag. The product information relates to a product and includes a unique identifier that is unique to the product. The product information is received from the tag. A local identifier is generated according to a predetermined rule such that the received product information corresponds to the local identifier. The local identifier is not unique to the product. The received product information is sent to a product information recording medium physically separated from the tag in order to store the received product information in the product information recording medium. The local identifier is sent to the tag and replaces the product information stored in the tag.

3 Claims, 5 Drawing Sheets

PRODUCT INFORMATION PROTECTING METHOD AND SYSTEM

BACKGROUND OF THE INVENTION

1. Technical Field

The present invention relates to a product information protecting method and a product information protecting system and, in particular, to a product information protecting method and product information protecting system that protect information about products purchased by a purchaser.

2. Related Art

In place of barcodes that identify the types of produce, wireless tags storing unique IDs are attached to some products to identify the types of the products or the individual products in these days. Using tags can offer significant benefits to both sellers and consumers of products. For example, sellers of products will be able to readily and reliably perform, or automate the management of the shipping products at factories, inventory, distribution, delivery, and management of products at distribution centers, and reception and inspection of incoming products and inventory at stores. On the other hand, benefits to consumers include proper sorting products into the proper categories when recycling, management of the history of repaired parts of cars, proper ordering-point management achieved by automated inventory and use-by-date management in refrigerators, washing program selection of washing machines with perfect consideration given to the material and durability of laundry, and prevention of harmful combinations of drugs or harmful concurrent uses of bleaches. In this way, the convenience of products can be significantly improved in their entire lifecycle, that is, in all stages from manufacturing to distribution to consumption to recycling of the products.

However, the use of wireless tags involves concerns about violations of privacy. This is because individual products can be easily identified and tracked by means of wireless tags and therefore the individual people who purchased and are taking along the products can be identified or located by identifying and tracking the products. These problems can be categorized into two: a first problem is that the owner of a product can be tracked by means of a unique identification (ID) of the product and a second problems is that the association between a wireless tagged product and its owner can be known by a third party. The unique ID held in the wireless tag attached to the product is not merely a number; but it can be used to search an appropriate database to retrieve attribute information about the product.

To solve the problems, a technique has been proposed that reduces the length of a tracking number, which is part of product information stored on a wireless tag called an RFID (Radio Frequency Identification) tag. However, the technique only reduces the length of tracking numbers identifying individual products and universal product codes which identify the product names are still stored in wireless tags. Therefore, the second problem described above is yet to be solved. Moreover, once product information stored on the wireless tag is reduced, it is difficult to restore the reduced portion of the information, which can be disadvantageous for reselling or recycling the products.

Thus, there is a need to provide a product information protecting system that protects information about products purchased by purchasers while allowing the information to be reused.

SUMMARY OF THE INVENTION

The present invention provides a method for protecting product information stored in a wireless tag, said method comprising:

receiving the product information from the tag, said product information relating to a product and comprising a unique identifier that is unique to the product;

generating a local identifier according to a predetermined rule such that the received product information corresponds to the local identifier, said local identifier not being unique to the product;

sending the received product information to a product information recording medium physically separated from the tag in order to store the received product information in the product information recording medium; and sending the local identifier to the tag in order to replace the product information stored in the tag with the local identifier.

The present invention provides a system for protecting product information stored in a wireless tag, said system comprising:

means for receiving the product information from the tag, said product information relating to a product and comprising a unique identifier that is unique to the product;

means for generating a local identifier according to a predetermined rule such that the received product information corresponds to the local identifier, said local identifier not being unique to the product;

means for sending the received product information to a product information recording medium physically separated from the tag in order to store the received product information in the product information recording medium; and means for sending the local identifier to the tag in order to replace the product information stored in the tag with the local identifier.

The present invention provides a method for protecting product information stored in a wireless tag, said method comprising:

sending the product information stored in the tag to a product information protecting apparatus in order for the product information to be subsequently stored on a product information recording medium that is physically separated from the tag, said product information relating to a product and comprising a unique identifier that is unique to the product;

receiving a local identifier from the product information protecting apparatus, wherein the local identifier is not unique to the product; and replacing the product information stored in the tag with the local identifier.

The present invention provides a system for protecting product information stored in a wireless tag, said system comprising:

means for sending the product information stored in the tag to a product information protecting apparatus in order for the product information to be subsequently stored on a product information recording medium that is physically separated from the tag, said product information relating to a product and comprising a unique identifier that is unique to the product;

means for receiving a local identifier from the product information protecting apparatus, wherein the local identifier is not unique to the product; and means for replacing the product information stored in the tag with the local identifier.

The present invention provides a product information protecting system that protects information about products purchased by purchasers while allowing the information to be reused.

DETAILED DESCRIPTION OF THE INVENTION

Figure 1:
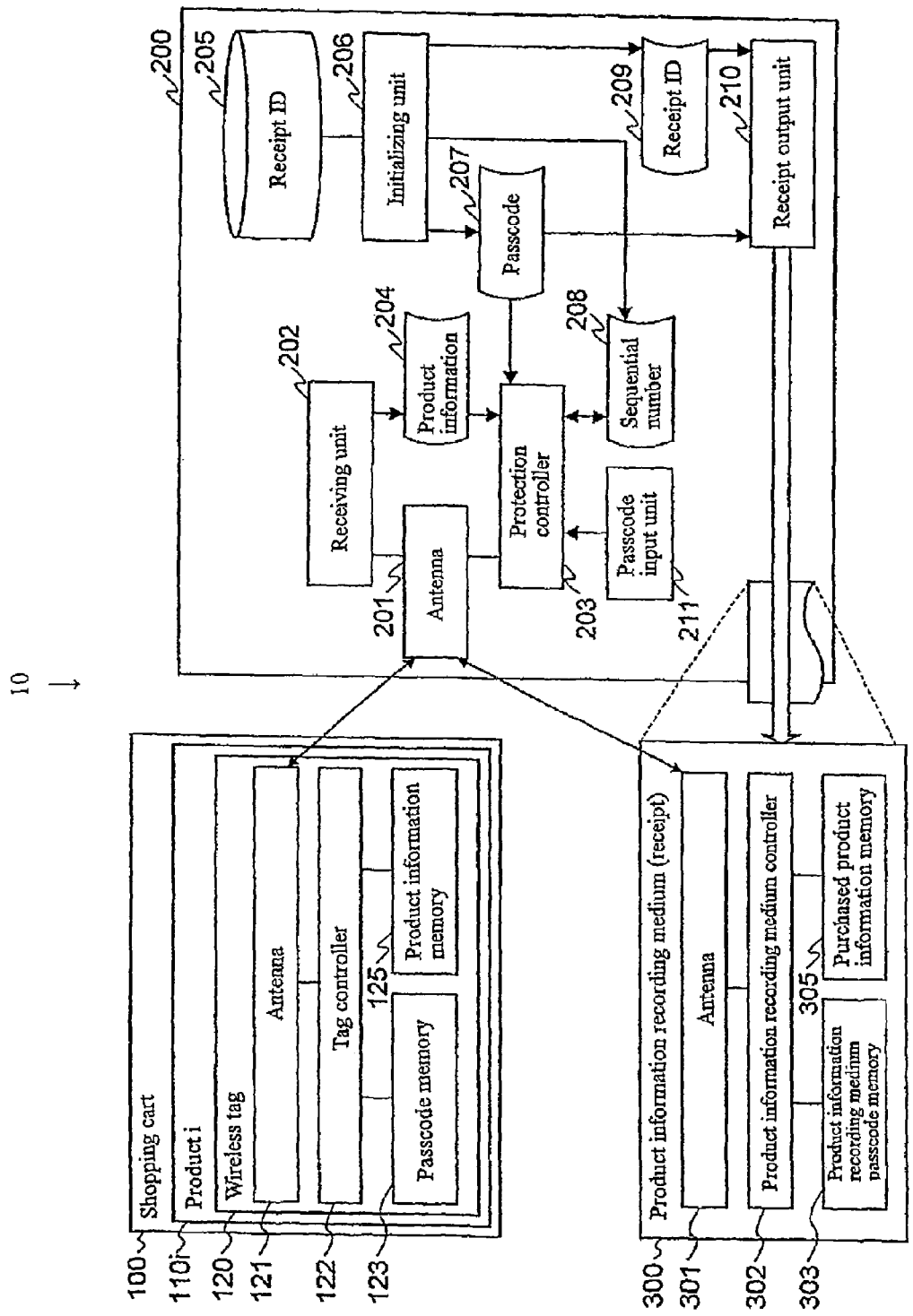
FIG. 1 shows a configuration of a product information protecting system that includes a product information protecting apparatus, according to embodiments of the present invention.

FIG. 1 shows a configuration of a product information protecting system 10, according to embodiments of the present invention. The product information protecting system 10, which protects information about products, includes tags 120, a product information protecting apparatus 200, and a product information recording media 300. The product information protecting system 10 may be used when products are purchased by a purchaser such as a consumer. The product information protecting apparatus 200 is incorporated into a cash resister placed in a shop, for example. The store has multiple types of products on display, each of which bears a tag 120. A purchaser selects a desired product or products from among the products and puts them into a shopping cart 100. The purchaser brings the product or products 110 in the cart 100 to a place where a cash register is placed. A store clerk operates the cash register containing the product information protecting apparatus 200 to cause it to communicate with the wireless tag on a product in the shopping cart 100 to obtain information about the product to be purchased. A purchaser may select one or more products to purchase at a time. For convenience of explanation, only the i-th product 110*i* among n products 110 in the cart 100 is shown in the present embodiment.

A tag 120 is attached to a product 110 and holds information unique to the product 110. The tag 120, which may be wireless tag capable of communicating with an external device, stores a passcode and a command state, in addition to product information identifying each product 110. After a passcode and a write protection lock are set on the tag 120, the product information is prevented from being replaced. If the set passcode matches a passcode received, the write protection lock is unlocked and replacement of the product information is permitted. The tag 120 may be a Class 1 tag from Alien Technology or a Class 1 passive read-only tag from EPC Global, for example (an EPC code can be written over the manufacturer's serial number of the tag).

The tag 120 includes an antenna 121, a tag controller 122, a product information memory 125, and a passcode memory 123.

The product information memory 125 is implemented by a rewritable non-volatile semiconductor memory and contains product information identifying a product. The product information is pre-written at factory in shipping. The product information includes a universal product code which identifies the product name and the manufacturer of the product, the list price, and a tracking number which identifies the individual product. The passcode memory 123 is implemented by a rewritable non-volatile semiconductor memory and stores a passcode for setting or releasing write protection to the product information memory 125, that is, the replacement lock. The tag controller 122 wirelessly sends information such as production information stored in the product information memory 125, receives a command, a passcode, and product information, and processes the command when receiving the command. For example, it replaces an item of information stored in the product information memory 125 with another piece of information it received wirelessly. If a passcode is set in the passcode memory 123 and replacement of information in the product information memory 125 is locked, the tag controller 122 compares a received passcode with the passcode stored in the passcode memory 123. If and only if they match, the tag controller 122 replaces information stored in the product information memory 125. The passcode typically cannot be read out from the tag 120 to the outside but is used within the tag 120 only for comparison with a passcode sent from an external source. Wireless transmission and reception are performed through the antenna 121.

The production information recording medium 300 is separate from tags 120, and product information associated with a local identifier, which will be described later, is recorded on it by the product information protecting apparatus 200. The product information recording medium 300 may be in the form of a purchase recording medium such as a receipt made of paper or plastic on which the names of product purchased and their prices can be printed and equipped with an IC capable of electrically recording information provided from the product information protecting apparatus 200, and also equipped with an antenna. Information about purchased products are recorded on the receipt, which is then ejected from the cash register and provided to the purchaser each time a purchase transaction is performed. Accordingly, the receipt, the purchase recording medium, is separated from the purchased products or the cash register incorporating the product information protecting apparatus 200. Information is recorded on the product information recording medium 300 by printing or electrically storing the information on the product information recording medium 300. It is assumed in the following description of the present embodiment that the product information recording medium 300 is of the form of receipt.

The product information recording medium 300 includes an antenna 301, a product information recording medium controller 302, a product information recording medium passcode memory 303, and a purchased product information memory 305 and has a structure similar to that of a tag 120.

The antenna 301, which may be implemented by a coil, provides wireless communication with antenna 201. The product information recording medium controller 302 uses the antenna 301 to communicate with the antenna 201 to sends a command and product information and receives a command, a passcode, and product information and processes the command received. The product information recording medium passcode memory 303 includes a rewritable non-volatile semiconductor memory and stores commands sent or received from through the product information recording medium controller 302, the state of the commands, and passcodes. The purchased product information memory 305 has a rewritable non-volatile semiconductor memory and stores product information associated with a sequential number, which is a local identifier sent by the protection controller 203 of the product information protecting apparatus 200 and received through the product information recording medium controller 302.

The product information protecting apparatus 200 is capable of communicating with tags 120 and the product information recording medium 300 wirelessly and cooperates with the tags 120 and the product information recording medium 300.

The product information protecting apparatus 200 includes an antenna 201, a receiving unit 202, a protection controller 203, a receipt identification (ID) database 205, an initializing unit 206, a receipt output unit 210, which is a product information recording medium output unit, and a passcode input unit 211.

The antenna 201, which may be implemented by a coil, provides wireless communication with antennas 121, 301. The receiving unit 202 communicates with the tag controller 122 and the product information recording medium controller 302 through the antennas 201, 121, and 301 to receive product information 204 which is stored in tags 120 which are attached to products 110 and identifies the products 110, and provides the information to the protection controller 203. The receiving unit 202 also receives product information stored on the product information recording medium 300 in a process for restoring product information. In particular, the receiving unit 202 receives product information which is sent from the product information recording medium controller 302 and stored in the purchased product information memory 305 and provides the information to the protection controller 203.

Unless otherwise specified, information stored in a physical object (e.g., the tag 120, the product information recording medium 300, etc.) of the product information protecting system 10 is stored either on a surface of the physical object or within an interior portion of the physical object.

Figure 2:
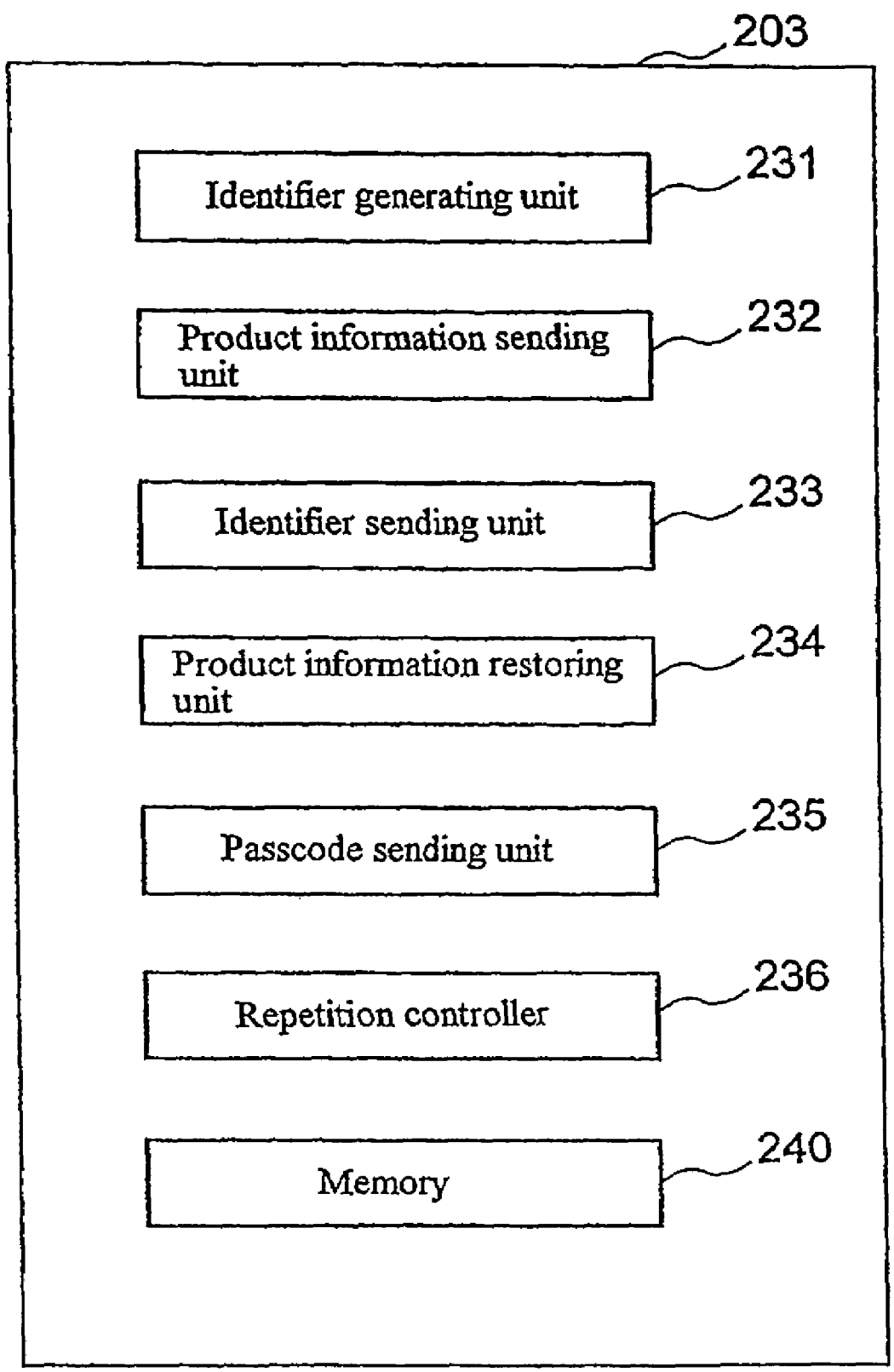
FIG. 2 shows a configuration of a protection controller of the product information protecting apparatus of FIG. 1, according to embodiments of the present invention.

FIG. 2 shows a configuration of the protection controller 203 which controls processing for protecting product information in the product information protecting apparatus 200, according to embodiments of the present invention.

The protection controller 203 includes an identifier generating unit 231, a product information sending unit 232, an identifier sending unit 233, a product information restoring unit 234, a passcode sending unit 235, and a repetition controller 236. The components of the protection controller 203 communicate with the tag controller 122 of a tag 120 and the product information recording medium controller 302 of a product information recording medium 300 through the antennas 201, 121, and 301. The components of the protection controller 203 send commands, passcodes, and product information to the tag controller 122 and the product information recording medium controller 302. The protection controller 203 also includes a memory 240 for temporarily storing production information 204 received at the receiving unit 202. The identifier generating unit 231 generates a local identifier according to a predetermined set of rules in response to reception of production information at the receiving unit 202. In particular, whenever the receiving unit 202 receives product information and provides it to the identifier generating unit 231, the identifier generating unit 231 increments the value of the sequential number 208, which is the local identifier, by 1. The product information sending unit 232 sends product information 204 associated with the sequential number 208 to the product information recording medium 300 separated from the tag 120 and causes the product information recording medium 300 to store the product information. The identifier sending unit 233 sends the sequential number 208 to the tag 120 in order to replace the product information in the tag 120 with the associated sequential number 208. The passcode sending unit 235 applies a replacement lock to the information stored in the tag 120 to prevent the stored information in the tag 120 from being replaced. The passcode sending unit 235 sends a passcode 207 generated by the initializing unit 206 as a code for unlocking the replacement lock to the tag 120. The product information restoring unit 234 replaces the sequential number 208 which is the local identifier stored in the tag 120 with product information associated with the sequential number 208. In particular, in a process for restoring product information, the product information restoring unit 234 sends the product information 204 associated with a sequential number received at the receiving unit 202 from the product information recording medium controller 302 to the tag controller 122. In response to this, the tag controller 122 replaces information stored on the product information memory 125 with the product information and thus restores the product information in the tag 120. The repetition controller 236 discerns conditions such as the value of the sequential number and controls repetitions of this process.

The receipt ID database 205 is implemented by a rewritable non-volatile semiconductor memory or storage disk device and stores receipt IDs which were numbered previously by the initializing unit 206. A receipt ID identifies an individual product information recording medium and is unique to the product information recording medium.

The initializing unit 206 initializes the sequential number 208 after the identifier generating unit 231 sends sequential numbers 208 to the tags 120 of all products 110 in a shopping cart 100 which represents a purchase transaction processed as a unit. The initializing unit 206 also generates a receipt ID that identifies a product information recording medium and a passcode based on the receipt ID. In particular, each time a purchase transaction is performed, the initializing unit 206 stores or reads a receipt ID in the receipt ID database 205, assigns the receipt ID 209, and encrypts the receipt ID 209 to generate a passcode 207, which is medium-specific information. Because the encryption does not compress the content of the receipt ID 209, the generated passcode is also unique to the product information recording medium. By using the encryption that does not compress a receipt ID 209, passcodes can be generated efficiently while the possibility of the same passcode being assigned to more than one tag 120 or of a receipt ID being guessed can be reduced. The passcode 207 generated by the initializing unit 206, and the sequential number 208 to be initialized are temporality stored in the memory 240. A sequential number 208 is unique to each of the products whose product information is stored in a product information recording medium 300 and accordingly unique within the product information recording medium 300. A sequential number 208 is a natural number which is incremented by 1 for example, starting at its initial value.

The receipt output unit 210 has a printing apparatus such as a printer and records the name, price, receipt ID 209, and passcode 207 of a purchased product by printing them on a product information recording medium 300. For example, product information recording media 300 may be stocked in advance in a cash register incorporating the product information protecting apparatus 200. When a purchase transaction is performed, required information is printed or electrically stored on one of the product information recording media 300 and the product information recording medium 300 is ejected from the cash register.

The passcode input unit 211 is implemented by a keyboard or a scanner and provides a passcode to the protection controller 203 according to the result of an operation performed by a checkout clerk reading the passcode printed on a product information recording medium such as a receipt, or to the result of scanning the passcode printed on the surface of a product information recording medium.

Conventional wireless tags which contain unique IDs identifying individual products or the types of products and are attached to the products for distribution management have posed the problem that the unique IDs make it possible for the owners of the products to be tracked or for the association between the products to which the wireless tags are attached and the owners to be known by third parties.

In the product information protecting system 10 according to the present invention, the product information protecting apparatus 200 deletes production information 204, which is a unique ID identifying a product 110 from a tag 120 attached to the product 110 and also replaces it with a sequential number 208 to retain association between the product information 204 and the sequential number 208 in the product information recording medium 300 which is a wireless tag physically separated from the product 110. Thus, the owner of the product information recording medium 300 is allowed to conveniently restore the product information 204 stored in the product information recording medium 300 on the tag 120 while a third party who does not own the physical product information recording medium 300 is prevented from obtaining the unique ID of the product 110 and hence the product information 204 which is attribute information about the product 110. That is, because the association between the sequential number 208 and the product information 204 is not held in any resources other than the product information recording medium 300, the attribute information about the product 110 owned by the owner cannot be leaked unless the third party obtains the product information recording medium 300, even if the third party reads, or steels, information from the wireless tag of the product.

Furthermore, in the product information protecting system 10 according to the present embodiment, product information 204, which is a unique ID of a product 110, is physically separated from the product 110. Therefore, the owner of the product 110 is protected from being tracked by means of the unique ID of the product 110. That is, the unique ID identifying the product 10 is temporarily removed from the tag 120 attached to the product 110, and the unique ID, which is product information, is held in the product information recording medium 300 physically separated from the product, thereby preventing the owner of the product from being tracked by tracking of the product.

Moreover, the product information protecting system 10 uses a sequential number 208 which is not unique to a product but is unique only within a product information recording medium 300, instead of product information 204 unique to the product, thereby preventing the association between the product 110 to which the tag 120 is attached and the owner of the product 110 from being known by a third party. Because the sequential number 208 is a natural number that is unique only within the product information recording medium 300, the same sequential number exists in a group of product information recording media. Therefore the sequential number is not unique in the group of product information recording media, is not unique to individual products on the market, and is not unique on a global scale, of course.

The product information protecting system 10 allows product information that has been separated to be conveniently restored from the product information recording medium 300 to the tag 120 (for later use at home or when recycling). During restoration of the product information, the tag controller 122 in the tag 120 receives the passcode from the product information protecting apparatus 200 and compares the received passcode with the passcode stored in the passcode memory 123. If and only if they match, information stored in the product information memory 125 is replaced. The passcode stored in the passcode memory 123 is an encryption of a receipt ID identifying the product information recording medium and has been recorded on the product information recording medium 300. Accordingly, product information cannot be written by using a passcode that does not match the passcode recorded on the product information recording medium 300 on which the product information about the product 110 is recorded, even if a sequential number stored on the product information recording medium matches the information stored in the product information memory 125 in the tag 120. This prevents a product information recording medium other than the product information recording medium issued at the time of purchase of the product from restoring wrong product information.

Figure 3:
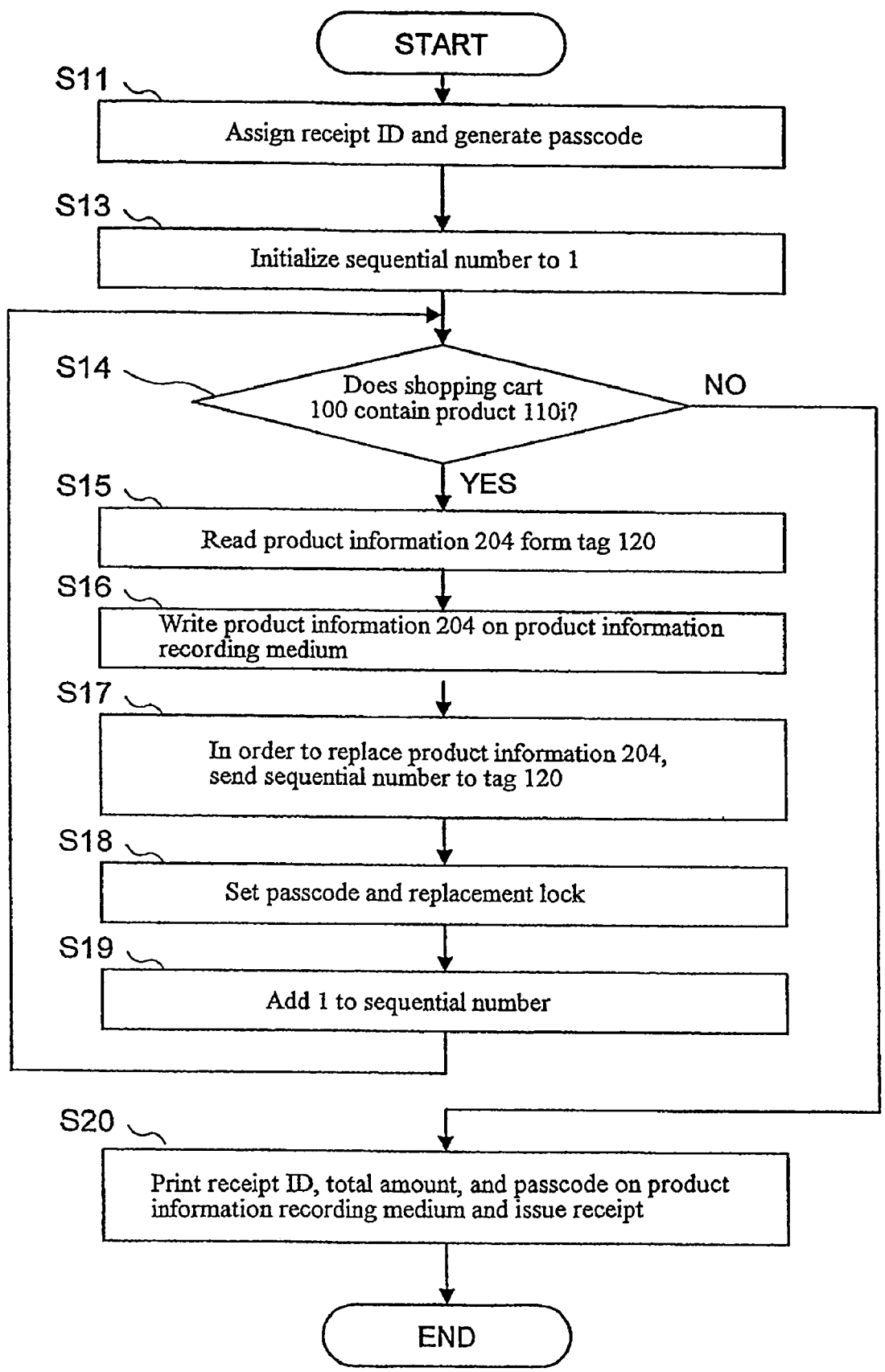
FIG. 3 is a flowchart illustrating an example of operation of the product information protecting apparatus of FIG. 1, according to embodiments of the present invention.
Figure 4:
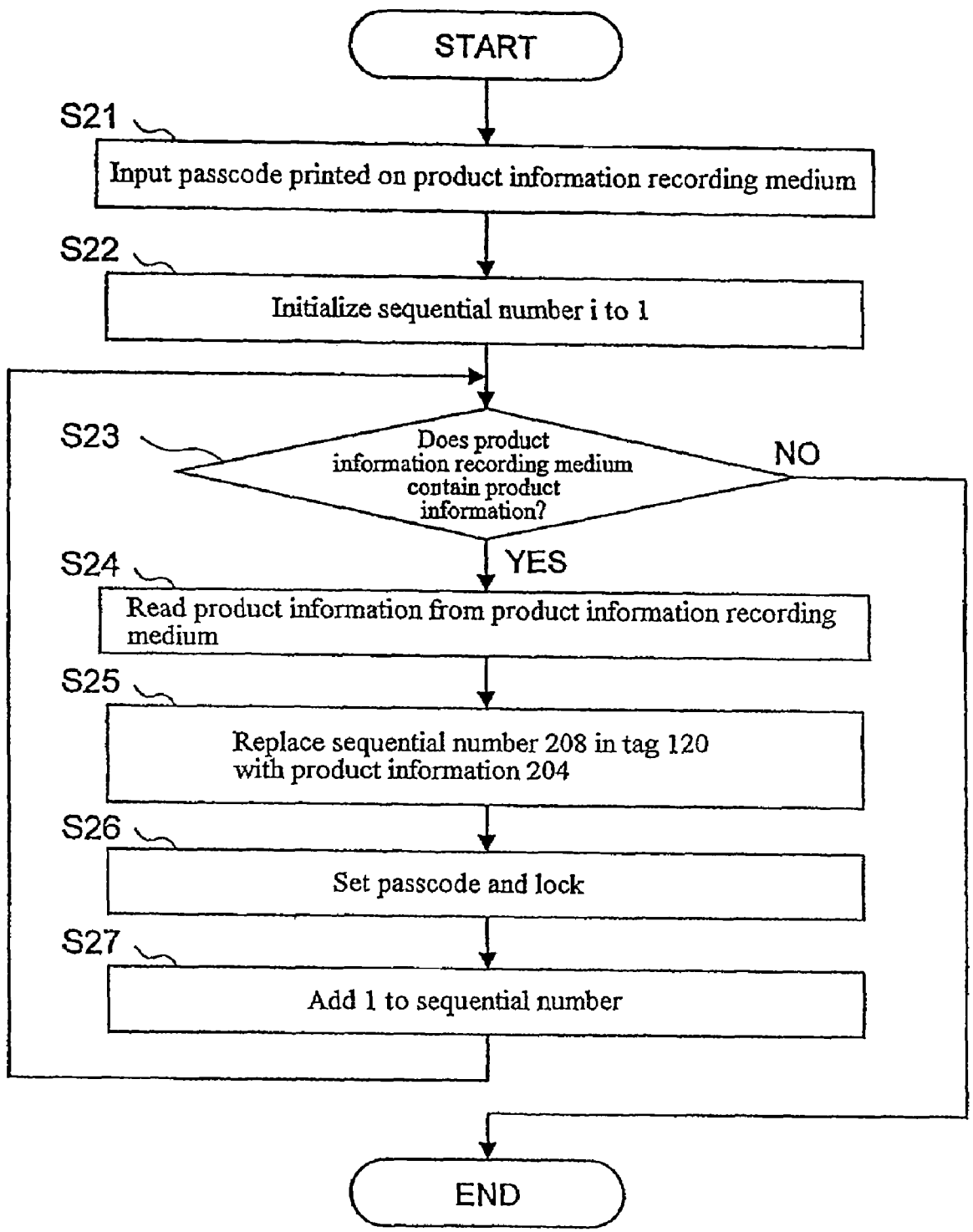
FIG. 4 is a flowchart illustrating an example of operation of the product information processing apparatus of FIG. 1, according to embodiments of the present invention

FIGS. 3 and 4 shows an example of operation of the product information protecting apparatus 200.

FIG. 3 shows a process performed by the product information protecting apparatus 200 for separating product information from a product 110, according to embodiments of the present invention. The process is performed concurrently with a purchase transaction in which a purchaser purchases the product at a store. When the purchaser selects and puts one or more desired products in a shopping cart 100 and places the shopping cart 100 near a cash register incorporating the product information protecting apparatus 200, the tags 120 attached to the products 110 in the shopping cart 100 becomes ready to wirelessly communicate with the product information protecting apparatus 200. It should be noted that a checkout clerk in the store operates the product information protecting apparatus 200 to help customers purchase products.

First, the initializing unit 206 of the product information protecting apparatus 200 assigns a receipt ID 209 for identifying a product information recording medium and generates a passcode 207 based on the receipt ID 209 (S11). The initializing unit 206 reads receipt IDs that it assigned in the past from a receipt ID database 205, selects a receipt ID 209 to use from among the receipt IDs that it have not assigned yet, and assigns it to the medium. The initializing unit 206 encrypts the receipt ID 209 to generate a passcode 207. The receipt ID 209 is used for identifying the product information memory 125 in the tag 120. The passcode 207 is used later for write protection of the product information memory 125 in the tag 120. The initializing unit 206 assigns a new receipt ID and generates and assigns a new passcode each time a purchase transaction is performed.

Then, the initializing unit 206 initializes the sequential number 208 (S13). The initializing unit 206 initializes the sequential number 208 to 1, for example. After one purchase transaction ends (at END in FIG. 3), the next process for separating production information from a product 110 will start (at START in FIG. 3). Therefore, once the process from steps S15 to S19, which will be described below, has been completed, the initializing unit 206 initializes local identifier assignments. Sequential numbers 208 are generated by the protection controller 203 in the order of reception of product information and each of which is unique only within the product information recording medium 300. The operation at step S13 assigns sequential numbers 208 again, which starts from the initialized number, to other product information recording media associated with other purchase transactions. Accordingly, the same sequential number will be contained in different production information recording media. Therefore, information unique to a product cannot be identified with just a tag 120 on which a sequential number is stored.

Then, the repetition controller 236 determines whether an additional product 110 about which the production information 204 has not been read remains in the shopping cart 100 (Sl4). In particular, the repetition controller 236 determines whether or not the sequential number 208 exceeds the number of the products 10 in the shopping cart 100. If the repetition controller 236 determines that additional products 110 are in the shopping cart 100, then steps S15 to S19 are performed. The repetition controller 236 repeats steps S15 to S19 for all products 110 in the shopping cart 100. Thus, all products 110 in the shopping cart 100 are processed.

Then, the receiving unit 202 receives product information 204 that identifies a product 110 and stored in one of tags attached to the products 110 to read the product information 204 from the tag 120 (S15). An example in which production information 204 is read from the i-th product 110 i among n products 110 in the shopping cart 100 will be described. In particular, the protection controller 203 issues a command to the tag controller 122 to read product information. In response to this, the tag controller 122 reads the product information 204 stored in the product information memory 125 and sends it to the receiving unit 202. The production information 204 received by the receiving unit 202 is temporarily stored in the memory 240. In this way, the product information protecting apparatus 200 receives production information 204 from the tag 120.

Then, the product information sending unit 232 sends the product information 204 associated with the sequential number 208 to the product information recording medium 300 separated from the tag 120 and causes it to store the product information 204 (S16). The product information sending unit 232 communicates with the product information recording medium controller 302 and sends to it a command to store the product information 204 together with the product information 204. The product information recording medium controller 302 stores product information 204 in the purchased product information memory 305 in the order the information 204 is sent from the protection controller 203. Accordingly, associative storage is accomplished in which the i-th product information stored in the purchased product information memory 305 is associated with the product 110 i having a value i of the sequential number 208 (see FIG. 5). The association exists only within the product information recording medium 300.

Then the identifier sending unit 233 sends the sequential number 208 to the tag 120 in order to replace the product information 204 with the sequential number 208 (S17). Furthermore, the passcode sending unit 235 locks the production information stored on the tag 120 from being replaced and sends a passcode 207 generated by the initializing unit 206 as a code for unlocking the replacement lock to the tag 120 (S18). In particular, the passcode sending unit 235 communicates with the tag controller 122 to send to it a kill command, that is, a command to delete the product information. In response to this, the tag controller 122 deletes (kills) the product information stored in the product information memory 125. Furthermore, the identifier sending unit 233 sends the sequential number 208 associated with the product information to the tag 120 in order to replace the product information stored on the tag 120. Accordingly the tag controller 122 stores the sequential number 208 in the product information memory 125. Thus, the product information is separated from the product 110 and replaced with the value i of the sequential number 208.

Because a write protection lock of the product information memory 125 has not been set before step S18 is started, the product information stored on the tag 120 can be replaced with the sequential number 208. Also, a passcode has not yet been set. In step S18, the passcode sending unit 235 applies a replacement lock to the information stored on the tag 120 and sends a passcode 207 generated by the initializing unit 206 as a code for unlocking the replacement lock to the tag 120. This prevents the information stored in the product information memory 125 from being replaced by a third party or being replaced with wrong information. The passcode 207 sent is stored in the passcode memory 123 by the tag controller 122.

Then, the identifier generating unit 231 adds 1 to the sequential number 208 (S19). Thus, a new sequential number 208 is generated in response to the reception of the product information. Therefore, another product 110 which is contained in the shopping cart 100 but whose information 204 is not yet to be sent or replaced can be selected at step S14 as the next product 110 to be processed. In this way, all products 110 which is contained the shopping cart 100 can be processed within a finite length of time without omission.

If it is determined at step S14 that a product 110 the production information 204 of which has not been read is in the shopping cart 100, the receipt output unit 210 prints a receipt ID 209, the passcode 207, a list of the purchased products, the total price, and other information on the surface of the product information recording medium 300 (S20). In this way, the passcode 207 is recorded on the product information recording medium 300 and the product information recording medium 300 is issued to the purchaser. The receipt ID 209 is required as an identifier of the product information recording medium but does not need to be wirelessly sent and received, and therefore recorded as print on the product information recording medium 300. By recording the passcode 207 as print on the product information recording medium 300, the risk that the passcode 207 in the product information recording medium 300 will be electrically read by a third party together with the production information which is subsequently stored can be reduced.

Figure 5:
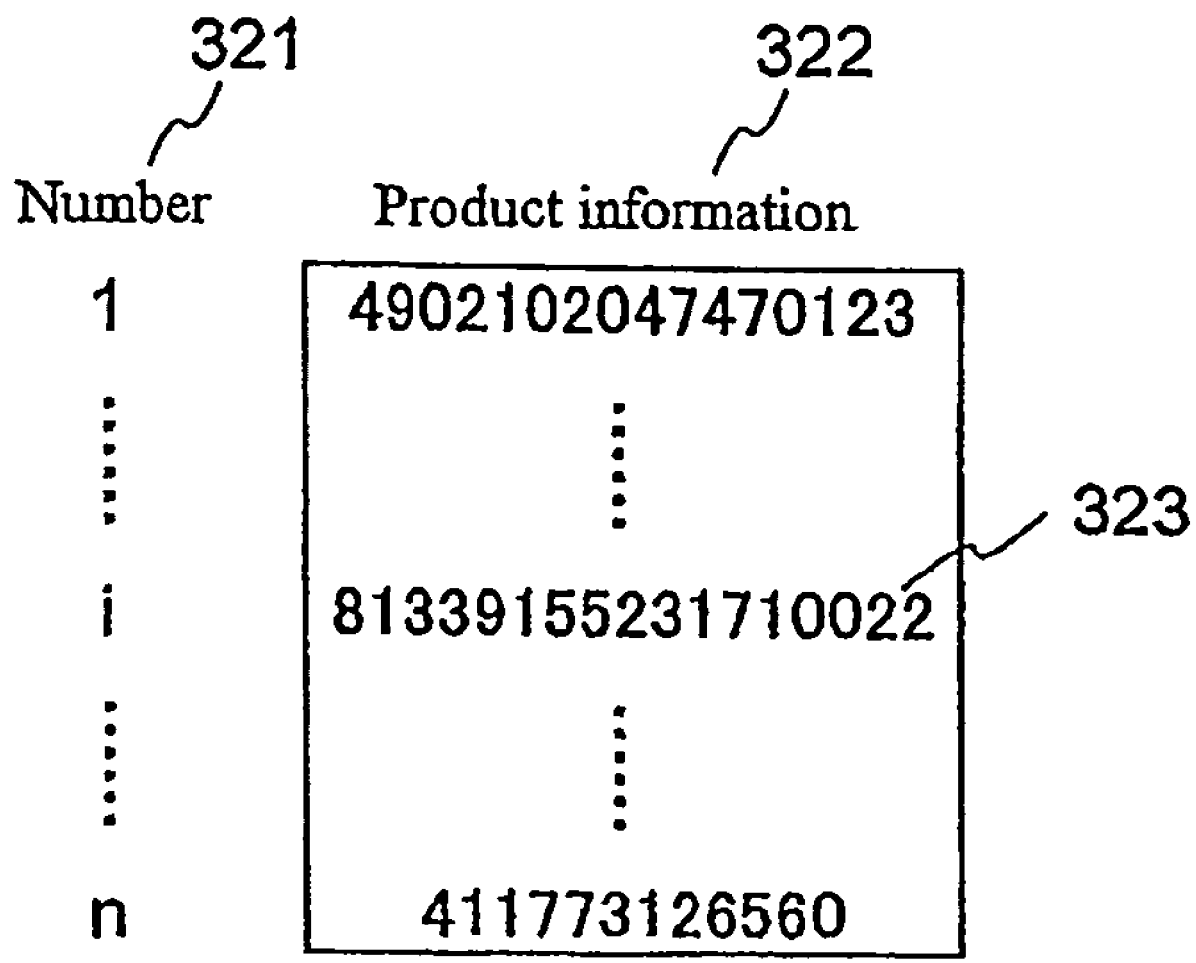
FIG. 5 shows an example of product information stored in a purchased product information recording unit of a product information recording medium of the product information protecting apparatus of FIG. 1, according to embodiments of the present invention.

Once step S20 is completed, the product information is separated from the tags 120 of all products 110 in the shopping cart 100 and their sequential numbers 208 are stored instead. The separated pieces of product information unique to the products 110 are stored in the product information recording medium 300 in association with the sequential numbers 208. FIG. 5 shows an example of product information stored in the purchased product information memory 305 of the product information recording medium 300, according to embodiments of the present invention. The product information separated from a product 110 is stored in a product information field 322 associated with each of the numbers 321, 1 to n in the order of associated sequential numbers. In the example shown in FIG. 5, "81339155231710022", which is the value of the product information 323 stored in the wireless tag of the product 110i, is stored at a location associated with number i of 321. On the completion of step S20, all product information temporarily stored in the memory 240 is deleted. Thus, the association between the product information unique to the product 110 and the sequential number i is held only on the product information recording medium 300. Then, the process in the flowchart performed in the product information protecting apparatus 200 for separating the product information from the products 110 will end.

By this operation, product information 204 is removed from a product 110 and stored in a product information recording medium 300 when a purchaser purchases a product in a store, that is, in the first stage of the consumption stages of the product's lifecycle. Therefore, the product information, and hence the attribute information about the purchased product 110, cannot be read by a third party who does not physically own the product information recording medium 300. For example, the identity of the product worn by the purchaser of the product can be prevented from being known by a third party trying to read product information from the wireless tag attached to the product through wireless communication and consult a database by means of the information.

FIG. 4 shows a process performed in a product information protecting apparatus 200 for restoring product information 110. This process is performed when a product purchased by a person is returned to the store or is provided to another personas recycled goods. It is assumed here that a person who purchased and owns a product 110 that underwent the process for separating product information shown in FIG. 3 is the owner of the product 110. When the product 110 that underwent a purchase process and therefore the production information of which is protected is brought near to the product information protecting apparatus 200 by the owner along with a product information recording medium 300, a tag 120 attached to the product 110 and the product information recording medium 300 become ready to communicate wirelessly with the product information protecting apparatus 200. It should be noted that a checkout clerk is in the store and operates the product information protecting apparatus 200 to help the owner involve in the product information restoring process.

The product information protecting apparatus 200 for restoring product information does not have to be the same product information protecting apparatus 200 used for separating product information as shown in FIG. 3 and need not be incorporated in a cash resister. However, if a purchased product is returned to the store, the product information protecting apparatus 200 for separating product information may also be used for restoring product information. The present embodiment will be described with respect to an example in which the product information protecting apparatus 200 for separating product information is also used for restoring product information.

First, the passcode input unit 211 sends a passcode printed or otherwise recorded on the product information recording medium 300 to a protection controller 203 in response to an operation performed by a checkout clerk (S21). The passcode 207 from the passcode input unit 211 is temporarily stored in the memory 240.

Then, the initializing unit 206 initializes a sequential number 208 to 1 (S22). The sequential number 208 is a natural number which is unique only within the product information recording medium 300. In order to ensure that all product information stored associatively in the purchased product information memory 305 in the product information recording medium 300 is processed, the initializing unit 206 initializes the sequential number 208 to 1.

Then, the repetition controller 236 determines whether or not the product information recording medium 300 contains product information associated with the sequential number 208 (S23). If the product information associated with the sequential number 208 is found, there is product information to be restored and therefore steps S21 and S22 are performed.

On the other hand, if it is determined that there is not product information associated with the sequential number 208, then the product information recording medium 300 does not contain additional product information to be restored and therefore the process ends. The number of pieces of product information stored in the purchased product information memory 305 in the product information recording unit 300 is countable and each piece of product information is associated with one sequential number. Therefore, product information that is yet to undergo the restoration process described below can be distinguished from product information that has already undergone the process. In this way, steps S21 and S22 are applied to all pieces of product information stored in the product information recording medium 300 to restore them to the corresponding products.

Then, the receiving unit 202 receives the product information associated with the sequential number 208 that is stored in the product information recording medium 300 (S24). An example will be described below in which a sequential number 208 i is reached. The protection controller 203 sends a command to read the product information associated with the value i of the sequential number 208 to the product information recording medium controller 302. In response to this, the protection controller 203 reads the production information and provides it to the receiving unit 202. The receiving unit 202 reads the product information 204 stored in the purchased product information memory 305 and provides it to the product information recording medium controller 302. The memory 240 temporarily stores the product information 204.

Then, the product information restoring unit 234 replaces the sequential number 208, which is a local identifier, stored in the tag 120 with the associated product information 204 (S25). In particular, the product information restoring unit 234 communicates with the tag controller 122 and sends a kill command (which deletes the sequential number) and a passcode 207 to the tag controller 122. In response to this, the tag controller 122 compares the passcode it received with a passcode stored in the passcode memory 123. If they match, the tag controller 122 deletes the sequential number (i) stored in the product information memory 125 to allow the product information to be replaced. The product information restoring unit 234 sends a command to store the product information 204 along with the product information 204 to the tag controller 122. In response to this, the tag controller 122 stores the product information 204 in the product information memory 125. Thus, the product information 204 is restored from the sequential number 208 i to the product 101i. The passcode sending unit 235 also sends the passcode to the tag 120 to apply a write protection lock to the tag 120 (S26). This can prevent the information in the production information memory 125 from being further replaced by a third party.

Then, the identifier generating unit 231 adds 1 to the sequential number 208 (S27). This reduces the number of products 110 the product information of which is stored in the purchased product information memory 305 in the product information recording medium 300 at the time of step S23 and which is not yet to undergo steps S21 and S22. Consequently, the product information stored in the product information recording medium 300 can be processed without overlapping or omission within a finite length of time.

On the completion of the process described so far (S23: NO), all product information 204 separated from the products 110 and stored in the purchased product information memory 305 in the product information recording medium 300 in association with the sequential numbers 208 is restored to their corresponding products 110. Then, the flowchart of the process performed by the product information protecting apparatus 200 for restoring the product information to the products 110 ends.

With this operation, product information unique to products 110 can be restored when the products are in use at home or are recycled, namely in the consumption stage of the lifecycle of the products. The owner of the product information recording medium 300 can restore the unique IDs to wireless tags attached to products.

The present invention is not limited to the embodiments described above but all variations and improvements thereof that can achieve the object of the present invention are included in the present invention.

For example, while the present invention has been described with respect to a receipt that is a print medium made of paper or plastic equipped with a built-in IC as a product information recording medium, the present invention is not so limited. The receipt may be combination of a rewritable card on which information can be re-printed and a magnetic card on which information can be magnetically stored, or an IC card that stores information only in electrical form, such as a credit card or a reward card. Such product information recording media can store items of product information concerning multiple purchase transactions together, and can provide the flexibility of further processing of the product information. A product information recording medium in the form of receipt provides convenience in that the need for a purchaser of products to perform a preparatory process such as a member shipping process for a reward card system is eliminated and protected information about the products can be processed subsequently by receiving the receipt issued in accordance with purchase transactions. Furthermore, pieces of product information about products purchased in one purchase transaction are recorded on a single receipt. Thus, the product information obtained in each purchase transaction can be associated with each individual product information recording medium.

While the present invention has been described with respect to the method in which passcode 207 is printed on the surface of a product information recording medium 300, the present invention is not so limited. For example, a passcode 207 may be electrically stored in the passcode memory 303. In particular, the passcode sending unit 235 of the protection controller 203 may send the passcode 207 to the product information recording medium controller 302 along with a command to store a passcode through communication with the product information recording medium controller 302. The product information recording medium controller 302 stores the passcode 207 it received in the product information recording medium passcode memory 303. To restore product information, the product information restoring unit 234 of the protection controller 203 sends a command to read the passcode 207 to the product information recording medium controller 302. This causes the passcode stored in the product information recording medium passcode memory 303 to be read out and sent to the receiving unit 202. The passcode 207 is provided to the protection controller 203. Storing the passcode 207 electrically in the passcode memory 303 of the product information recording medium 300 can provide the convenience of the ability to read the passcode electrically when product information is to be restored.

On the other hand, if a passcode 207 is recorded on the product information recording medium 300 by printing, higher-level protection against disclosure of the passcode can be ensured. That is, this can reduce the possibility that the passcode might be read through remote operation such as wireless communication operation with being unknown to the owner of the passcode, product information might be leaked to a third party by means of the passcode and owner's undesired restoration of the product information might be performed. For example, if a passcode is recorded by printing, it is difficult to read both of the passcode and product information from a location out of the owner's sight without permission even if the product and the receipt are held at the same time immediately after the purchase of the product. Thus, the product information can be protected more securely.

While the identifier generating unit 231 adds 1 to the sequential number 208 to generate a new sequential number 208 as a local identifier each time product information is received from a tag 120 in the embodiment described above, the local identifier of the present invention may be generated by adding a value greater than 1 to, or subtracting a value from the sequential number 208.

While the medium-specific information unique to product information recording media are passcodes 207 generated by encrypting receipt IDs 209 in the embodiment described above, the present invention is not so limited. The passcodes 207 may be any information that identifies individual product information recording media. For example, the passcodes 207 may be receipt IDs themselves. However, using encrypted passcodes 207 can prevent the medium-specific information from being readily guessed.

Furthermore, passcodes may be generated independently of receipt IDs, provided that the same passcode is not assigned to more than one receipt. Generating passcodes independently of receipt IDs can prevent the passcodes from being leaked by cryptoanalysis or by guessing them from the receipt IDs.

What is claimed is:

1. A method for protecting product information about one or more selected products attached to one of a plurality of tags, comprising the steps of:

receiving the product information for identifying the product stored in one of the plurality of tags attached to one or more selected products;

generating a local identifier in accordance with a predetermined rule according to the reception of the product information;

creating a lock for the product information stored in the one of the plurality of tags;

sending the product information corresponding to the local identifier, in order to store the product information in a product information recording medium isolated from the one of the plurality of tags;

generating a receipt identifier for identifying the product information recording medium;

encrypting the receipt identifier without compression of the receipt identifier, with the encryption of the receipt identifier specific to the product information recording medium;

generating the passcode for the one of the plurality of tags based on the encryption of the receipt identifier;

storing the passcode on the product information recording medium;

sending the local identifier to the one of the plurality of tags, in order to replace the product information with the corresponding local identifier, wherein the local identifier is a sequential number;

assigning each of a plurality of pieces of the product information a separate instance of the sequential number;

generating a replacement lock for the product information stored in the one of the plurality of tags after replacing the product information with the sequential number;

generating a replacement passcode for the one of the plurality of tags based on the receipt identifier;

determining whether there is product information to be restored by comparing a first received passcode to a second passcode stored in the product information recording medium;

restoring the product information to the one of the plurality of tags in place of the sequential number;

applying a write protection lock to the one of the plurality of tags after the product information is restored;

controlling repetition of the sequential number with a repetition controller, wherein the sequential number is unique within the product information but not unique to a product; and determining whether the number of selected products is greater than the sequential number.

2. The method for protecting product information of claim 1, comprising steps of:

receiving the product information stored in the product information recording medium;

determining whether there is product information to be restored by determining whether product information associated with the sequential number is found; and replacing the local identifier stored in the tag with the corresponding product information.

3. The method for protecting product information of claim 2, comprising:

producing a medium unique information, which is unique to the product information recording medium;

locking a replacement of the product information stored in the tag;

concurrently, sending the medium unique information to the tag as a code for unlocking; and recording the medium unique information to the product information recording medium.

* * * * *